(No Model.) 6 Sheets—Sheet 2.

J. B. SECOR.
TYPE WRITING MACHINE.

No. 450,775. Patented Apr. 21, 1891.

Witnesses:
Harry R. Williams
A. B. Jenkins.

Inventor,
Jerome B. Secor
by Simonds & Burdett,
Attorneys

THE NORRIS PETERS CO., PHOTO-LITHO., WASHINGTON, D. C.

(No Model.)  6 Sheets—Sheet 3.

J. B. SECOR.
TYPE WRITING MACHINE.

No. 450,775. Patented Apr. 21, 1891.

Witnesses:
Harry R. Williams,
A. B. Jenkins.

Inventor,
Jerome B. Secor,
by Simonds & Burdett,
Attorneys.

(No Model.) 6 Sheets—Sheet 4.

J. B. SECOR.
TYPE WRITING MACHINE.

No. 450,775. Patented Apr. 21, 1891.

Witnesses:
Harry R. Williams.
A. B. Jenkins.

Inventor,
Jerome B. Secor
by Simonds & Burdett,
Attorneys

(No Model.) 6 Sheets—Sheet 5.

J. B. SECOR.
TYPE WRITING MACHINE.

No. 450,775. Patented Apr. 21, 1891.

WITNESSES
Wm C Lewis
Geo. S. Parks

INVENTOR
Jerome B. Secor.
by Simonds & Burdett
Attorneys

(No Model.)  6 Sheets—Sheet 6.

J. B. SECOR.
TYPE WRITING MACHINE.

No. 450,775.  Patented Apr. 21, 1891.

WITNESSES
Wm C. Lewis
Geo. S. Parks

INVENTOR
Jerome B. Secor.
by Simonds & Burdett
Attorneys

UNITED STATES PATENT OFFICE.

JEROME B. SECOR, OF BRIDGEPORT, CONNECTICUT.

TYPE-WRITING MACHINE.

SPECIFICATION forming part of Letters Patent No. 450,775, dated April 21, 1891.

Application filed February 6, 1890. Serial No. 339,500. (No model.)

*To all whom it may concern:*

Be it known that I, JEROME B. SECOR, of Bridgeport, in the county of Fairfield and State of Connecticut, have invented certain new and useful Improvements in Type-Writing Machines, of which the following is a full, clear, and exact description, whereby any one skilled in the art can make and use the same.

My invention relates to the class of type-writing machines in which the keys and type-bars are borne in the upper part of the structure, while the platen is arranged to be reciprocated below the key-lever base.

The object of my invention is to provide a compact and serviceable machine of this class adapted to write both upper and lower cases, and one that is also provided with a full set of punctuation-marks and characters that adapt the machine to varied and extended uses.

My invention consists in the details of the key and type base, roller-platen, platen-operating and paper-feed device, and in their combination, as more particularly hereinafter described, and pointed out in the claims.

Referring to the drawings.

In the accompanying drawings, the letter A denotes the base of the machine, that is preferably formed of metal cast to shape with the platen-carriage way $a$, extending transversely of the base. On the upper part of the base are the arms $a'$, to which is pivoted the open key-base B. The arms or brackets $a'$ rise from the front of the machine and extend rearward, so that the key-base that is pivoted to the back end of the arms is held in an inclined position with reference to a horizontal plane, the pivots $b'$ serving as the rear support for the key-base, while the front edge is supported by contact with the bed when the base is in its normal position for operating the type-bars. This key-base is open at the center, and the key-board $b''$ is annular in form, the keys $b^3$ being disposed in a circle about the central opening in the key-base. Each of the keys consists of a rod $b^4$, arranged in a substantially vertical position, passing through an opening in the key-board $b''$ and being provided with the finger-pad $b^5$ at the upper end, on which the letter or character is marked and pivotally connected at the lower end of the type-bar $c$. The point of connection between the type-bar and key-rod is between the pivot of the type-bar and the type, forming a lever of the third class in the operation of the type-bar. On each key-rod a spring is arranged underneath the pad and between it and the top of the key-board, the spring operating to hold the key-rod raised.

Each type-bar $c$ is pivoted in a socket formed in the key-base, a short arm $c'$ extending outward from the pivot and forming what may be termed the "heel" of the lever. These short and outward-extending arms of each of the type-bars are in contact with a collar $d$, that is a ring of metal surrounding the type-base. This collar is supported at its opposite sides and centrally of the collar by means of the arms $d'$, that project from the rock-shaft $d''$, supported in bearings $d^3$ on the front of the key-base, and also by the connecting-rods $d^4$, that are pivoted to upward-extending parts $d^9$ from the collar on the sides, and also to the side posts $b^6$, that serve to connect the key-base and the keyboard. There are four of these posts—two at the front and two at the rear of the key-base. The type-bar is caused to print by pushing down upon the key-rod $b^4$, the type-bar being tilted forward, so as to cause the type borne on its upper end to strike upon the paper borne on the platen-roller. When the type-bar is thus operated, the collar $d$ is lifted; but its weight causes but little resistance to the movement of the type-bar owing to the fact that the counter-balance $d^5$ is secured to the rock-shaft on the side opposite the collar. The spring $d^6$, secured at one end to the key-base and to the connecting-rod $d^4$, determines the degree of pressure of the collar upon the type-bars, and this spring is used because it is quicker in action and permits the keys to be operated with greater rapidity than would be possible if the weight of the collar alone were utilized to cause the key-bar to return to its normal position.

Figure 1:
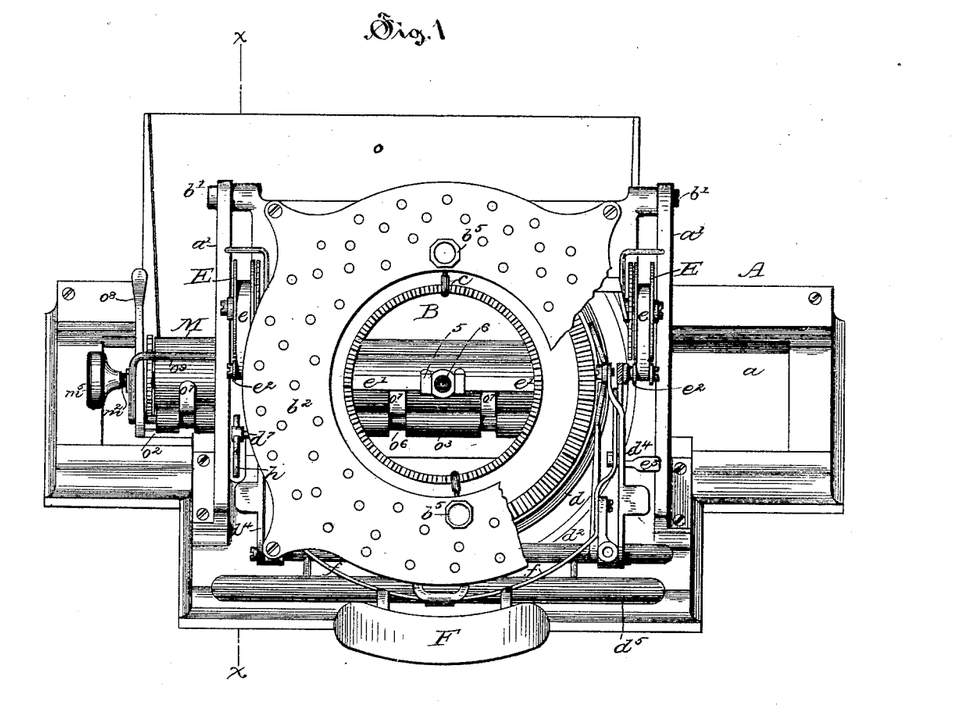
Figure 1 is a top view of the machine, with parts broken away to show construction.
Figure 2:
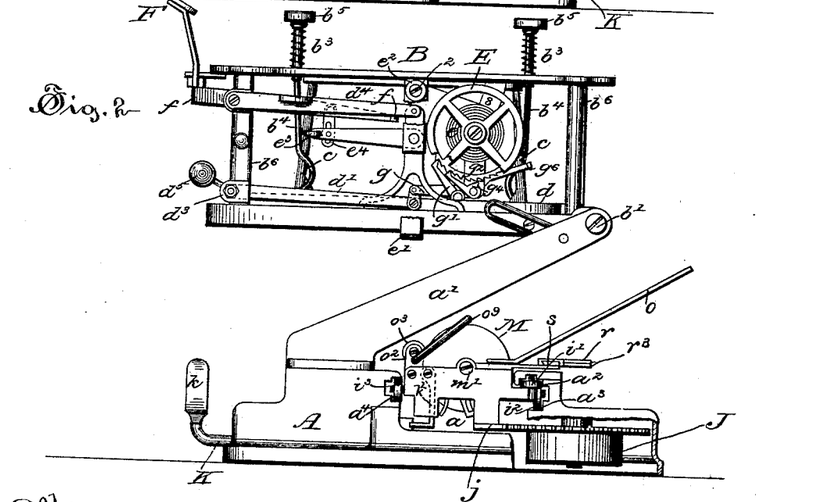
Fig. 2 is a detail end view looking from the right.
Figure 3:
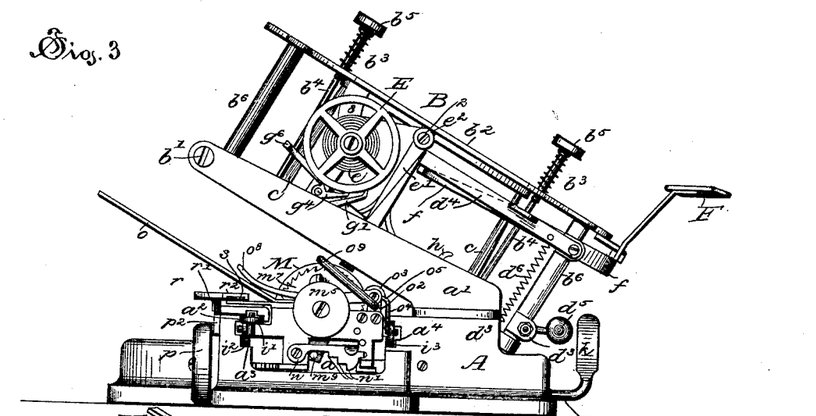
Fig. 3 is a detail end view looking from the left.
Figure 4:
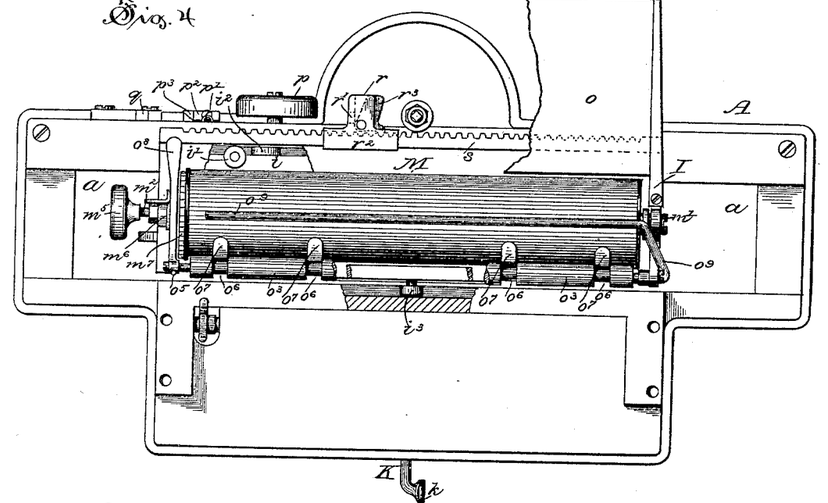
Fig. 4 is a detail top view of the roller-platen, showing the method of mounting the carriage in the base and the roll in the frame.
Figure 5:
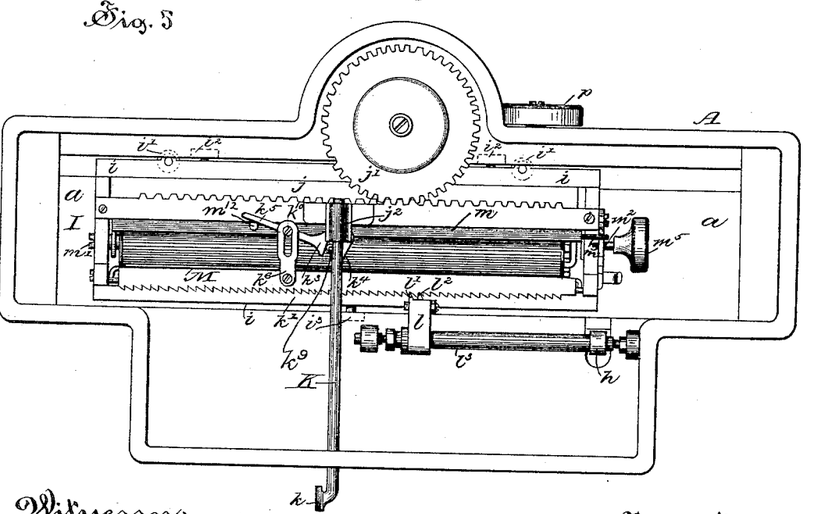
Fig. 5 is a detail bottom view of the platen and its carriage, and also showing the escapement mechanism.
Figure 6:
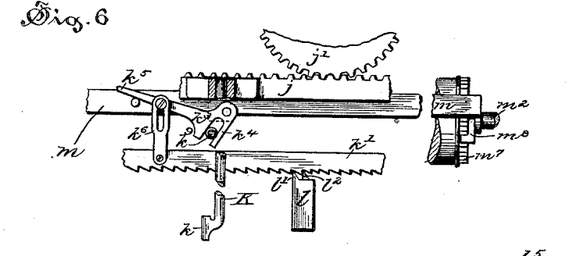
Fig. 6 is a detail view of the platen-feed mechanism.
Figure 7:
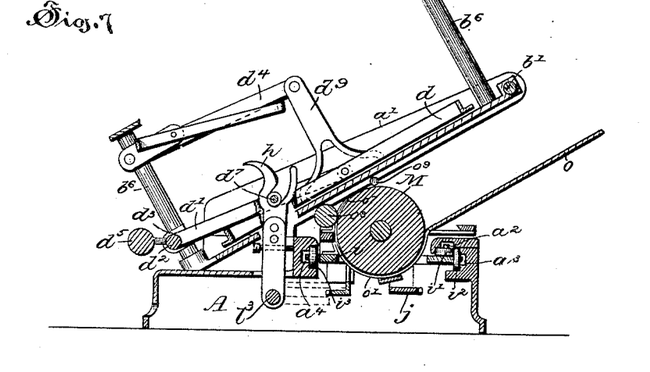
Fig. 7 is a detail view in vertical section through the machine on plane $x$ $x$ of Fig. 1.
Figure 8:
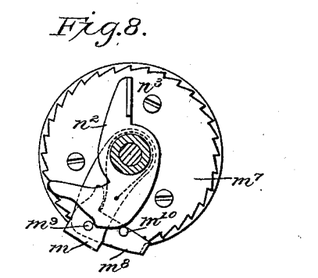
Fig. 8 is an end view of the roller-platen ratchet, with the swinging frame and pawls.
Figures 9, 13:
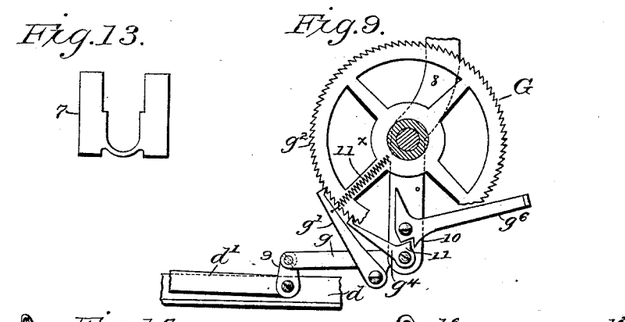
Fig. 9 is a detail of the ribbon-reel, ratchet-wheel, pawls, and levers.
Fig. 13 is a view of the ribbon-sleeve at the central part of the ribbon-guide extended.
Figure 12:
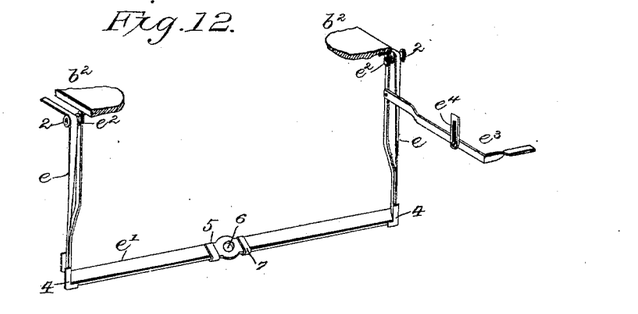
Fig. 12 is a detail of the ribbon-guide frame.
Figures 14, 15:
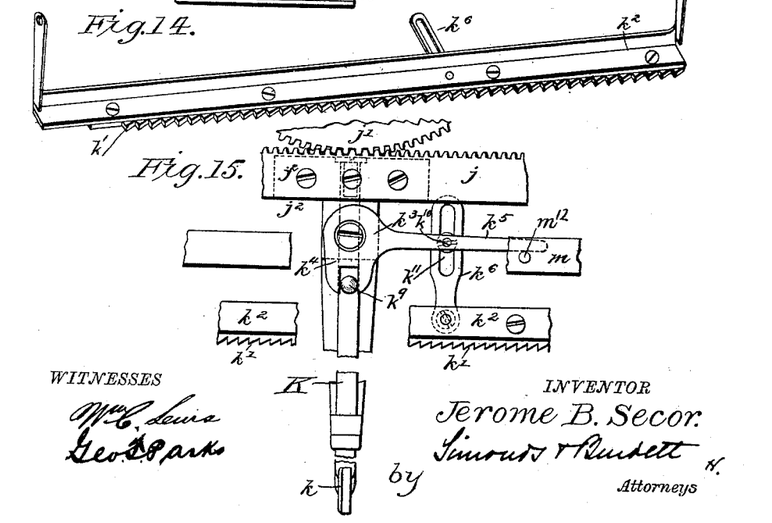
Fig. 14 is a view of the detent-bar.
Fig. 15 is a view in detail of the shifting-lever and associated parts.
Figure 16:
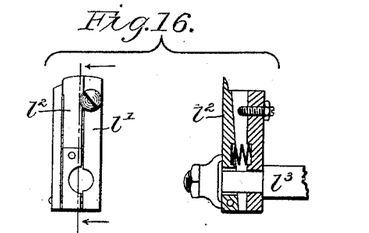
Fig. 16 a detail of the escapement.
Figure 17:
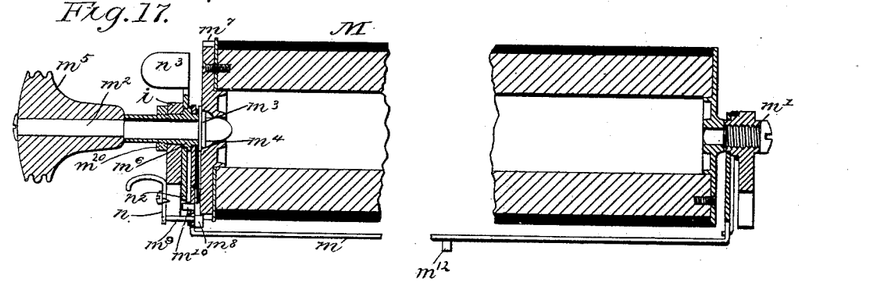
Fig. 17 is a central longitudinal section of the platen-roller and its pivotal mountings.
Figure 18:
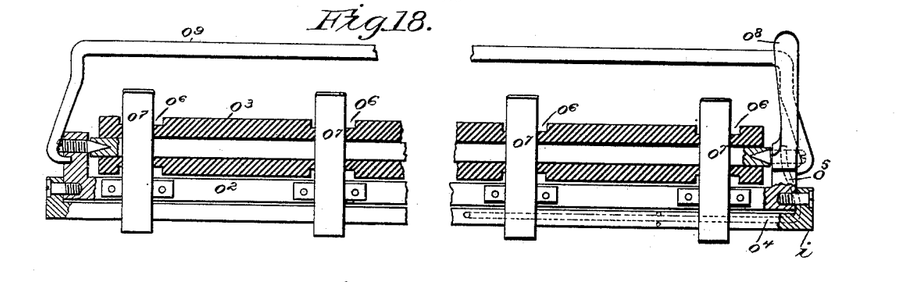
Fig. 18 is a view of the swinging frame, showing the fingers attached.
Figure 19:
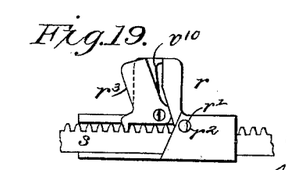
Fig. 19 is a detail of the adjustable tripping-sleeve and catch.
Figure 20:
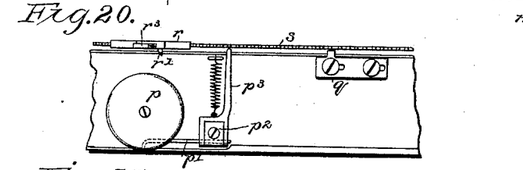
Fig. 20 is a view of the carriage-stop and bell mechanism.

The ribbon-reels E are secured on opposite sides of the key-base, and are preferably mounted flatwise against the side of the frame, so that the ribbon $e$ is obliged to take a quarter-turn before passing across the key-base at its center in position to be struck by the type. The ribbon-guide $e'$ is a U-shaped frame pivoted at its upper end to the side of the key-board $b^2$ on pivot-pins 2, on which are mounted the ribbon-guide rolls $c^2$, over which the ribbon passes to the ribbon-reel. The ribbon-guide is flanged at the angles or corners, as at 4, to carry the ribbon with certainty, and in the center of the ribbon-guide is formed a broadened portion 5, having a central opening 6 to permit any one of the type to strike directly downward upon the exposed ribbon and make the impression on the paper. The broadened portion 5 of the ribbon-guide has secured to it a piece of metal 7, which is of the form shown in Fig. 13, this piece being turned down and under the bar of the ribbon-guide to grasp or inclose the ribbon, as shown in Fig. 12. This construction is shown in detail in Fig. 13 of the drawings. The ribbon-guide is provided at the side with a handle $e^3$, by means of which the ribbon can at will be swung to one side, so as to uncover the line of writing. This handle is connected by a link $e^4$ with the side part of the space-bar lever $f$, so that each time the space-bar F is operated it also swings the ribbon-guide aside, so as to uncover the line of writing. This space-bar F is located on the front of the machine and is borne on a spacing-bar lever that is pivotally connected to brackets on the corner posts $b^6$ at the front of the frame, the inner end of the spacing-bar levers underlying and being in contact with the guide-rods $d^4$, so that the collar is lifted each time the spacing-bar is operated, this upward motion of the collar $d$ being necessary in order to operate the ribbon-reel, the feed mechanism of which is pivotally connected to the collar at the sides.

The ribbon-feed mechanism G consists of a lever $g$, pivoted at one end to an arm 8 on the key-board, which supports the ribbon-reels, and having its other end fulcrumed to a lug or link 9, connected to the collar $d$, substantially as shown. The lever $g$ bears a pawl $g'$, the forward end of which engages the ratchet-wheel $g^2$ on the side of the ribbon-reel, so that when the lever $g$ is thrown upward by the vertical movement of the collar the forward end of the pawl will engage a tooth of the ratchet-wheel and give the wheel a forward movement. On the pivot on which the lever $g$ is supported in the arm 8 is mounted a stop-pawl $g^4$, held in yielding engagement with the ratchet-wheel, the office of which pawl is to prevent any movement of the ribbon-reel, except that given to it by the action of the pawl $g'$. On the arm 8 is pivoted a stop-lever $g^6$, formed with a lug or projection 10, which engages a lug or projection 11 on the pawl $g^4$ and serves to throw the pawls $g^4$ and $g'$ out of engagement with the ratchet-wheel by the former pawl pushing the latter down. The stop-lever $g^6$ being moved upward and from engagement with the lug on the pawl, the pawls are lifted into engagement with the ratchet-wheel by a spring $11^\times$, connected thereto and to some stationary part of the machine and arranged to exert an upward force. As there are two of these ribbon-reels and ribbon-feed mechanisms, when one is in engagement with the feed mechanism the other is thrown out of engagement, so as to allow the ribbon that is wound up on one of the reels to be unwound from the opposite reel.

One of the arms $d'$, that connect the rack-bar and the collar, has a projecting lug $d^7$, that is in engagement with the escapement-lever $h$. The upper end of this lever is forked, so that the lug extends between its arms, and this allows the key-base to be lifted and thrown out of engagement with the escapement mechanism and at the same time makes provision for automatically engaging the lifting-ring and key-operating mechanism with the escapement mechanism as soon as the key-base is returned to its proper position.

The platen-carriage I consists of an oblong frame $i$, which fits within the carriage-way $a'$ in the frame, that bears on the back near each end a horizontal roller $i'$ and a vertical roller $i''$, the horizontal rollers moving in a grooved way $a''$, formed in the base, and the vertical rollers moving along a track $a'''$, the object being to support the frame in two diametrically-opposite planes, so as to give greater ease of movement. On the front of the frame $i$ there is arranged a single bearing-roller $i'''$, traveling in a grooved way $a^1$ in the front part of the base A. The latter roll is arranged in a vertical plane and is at or near the center of the carriage-frame. A toothed rack $j$ is secured across the lower part of the carriage-frame $i$, the teeth being in mesh with the teeth of a cog-wheel $j'$, that is secured to the spring-barrel J, that is of ordinary construction and supports a spring, one end of which is fast to the barrel and the other to a winding-spindle that is held by the ordinary ratchet and pawl against return movement while permitting the spring to be wound up. The spring-barrel is driven by its contained spring in a direction that tends to move the platen-carriage toward the left when the escapement mechanism is disengaged either by the operation of the detent-lever, or of the space-bar, or of a key in writing. To this rack $j$ is also attached a housing $j''$ for the shifting-lever K, that extends underneath the base and terminates in an upturned handle $k$, that is used for the purpose of controlling the movement of the platen-carriage and is used for sliding it back and forth in its supports on the bed. This shifting-lever K has a double function, being used for the purpose of disconnecting the rack-bar $k'$ on the detent-bar from the escapement, so as to enable the carriage to be moved either way when out of engagement with the escapement, and it also forms, when used in connection with the roller-feed mechanism, a line-spacing device. By pushing on the handle toward the right the shifting-lever is rotated, so as to release the ratchet from the detent mechanism, and by turning the lever to the left it operates to move the platen-roll, so as to feed the paper for the purpose of spacing the lines.

The rack-bar $k'$ is secured to the lower part of a ∪-shaped frame $k''$, that is pivoted to the side parts of the carriage-frame $i$, the rack-bar underlying the carriage and its toothed edge being turned toward the teeth of the escapement. It is connected to the bent lever $k'''$, that is pivoted to the housing with one arm $k^4$ in engagement with a projecting arm $k^9$ on the shifting-lever, and the longer arm $k^5$ lying back of a lug $m^{12}$ on the roller-feed frame $m$. A link $k^6$ connects the rack-bar with the bent lever in such manner that a backward movement of the bent lever will draw the rack-bar out of engagement with the escapement, while a forward movement of the same bent lever does not disturb the rack-bar, the pin $k^{10}$ connecting the bent lever and the link sliding freely in the slot $h^{11}$ in the link.

The escapement $l$ is of ordinary construction, consisting of a fixed tooth $l'$ and a spring-tooth $l''$, borne on a block that is fast to a rock-shaft $l'''$, supported in bearings on the under side of the base.

The roller-platen M is supported at one end on the screw-pivot $m'$, that has a screw-threaded socket in one end of the carriage-frame, and the roller is supported at the other end by a longer pivot $m''$, that is removably connected to the roller by the squared end $m'''$, that fits into the angular slot or recess $m^4$, formed in the plate at the end of the roller. The outer end of this pivot $m''$ has a handle $m^5$, by means of which the roller can be readily turned at will in either direction when the ratchet feed mechanism is disengaged. This pivot $m''$ is secured in a socket in the side part of the frame of the carriage $i$ by means of a nut $m^{20}$, that is secured to a sleeve surrounding the pivot and holds the frame between a collar $m^6$ and the nut. This pivot is held against endwise play, but is left free to rotate.

The step-by-step rotary movement of the roller-platen is accomplished by a forward swinging movement of the roller feed-frame $m$. This roller feed-frame has its ends turned up vertically and is pivoted on the pivots which support the roller-platen. On one end of the roll (in this case the one that bears the handle) is the ratchet-wheel $m^7$, and with its free end in engagement with the teeth of this ratchet-wheel there is a spring-pawl $m^8$, that is pivoted to the roller feed-frame $m$ and is kept in engagement with the ratchet by spring 12, the end of the pivot $m^9$ projecting beyond the side of the frame for the purpose of co-operating with a stop $n$ to limit the swinging movement of the feed-frame $m$. The stop $n$ is pivoted to the side of the carriage-frame $i$ and has a swinging movement across the line of movement of the pivot $m^9$, the shoulders $n'$, located at different distances along the lower edge of the stop, serving to intercept the pivot and limit the forward swinging movement of the feed-frame $m$ and, therefore, the rotary movement of the roller-platen. The paper that may be held on the roller-platen is fed upward by the rotary movement of the roller-platen, and the extent of its motion determines the line-spacing of the writing. Any desired number of shoulders may be formed on the stop, so as to give the necessary adjustment for several degrees of line-spacing. The stop is formed, preferably, of a flat piece of spring metal with a projecting handle, by means of which the catch on its forward end may be engaged or disengaged from the several holes into which the stop is sprung to hold it against accidental movement when in either of the several positions of adjustment of the stop. The spring-pawl $m^8$ has a projecting pin $m^{10}$, against which the lower end of the cam-lever $n''$, that is pivotally supported on the side of the frame, may be swung in such manner as to throw the pawl wholly out of engagement with the ratchet-wheel on the roller-platen. This cam-lever is operated by means of the handle $n'''$, that is located just above the pivot on the left of the carriage-frame. When the spring-pawl is thus thrown out of engagement by the cam-lever, the platen-roller can be freely turned in either direction by means of the handle $m^5$.

Figure 10:
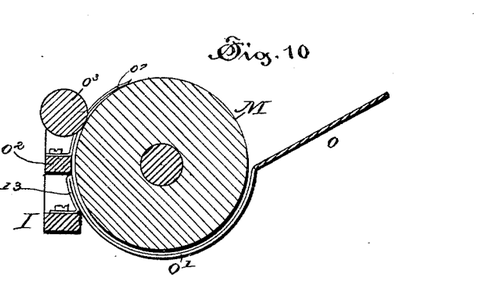
Fig. 10 is a transverse section of the platen-roller and finger-frame and section of the paper-platen.
Figure 11:
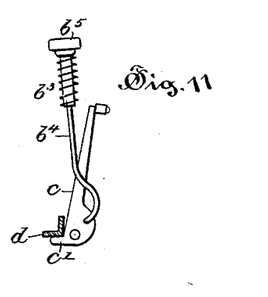
Fig. 11 is a detail of the type-bar and type-lever.

To the back of the platen-carriage is secured an inclined paper-support $o$, that in this case is made of a flat piece of thin metal, the lower part of which is cut into the form of fingers $o'$ that extend underneath the paper-roll and about half-way around it to a point where the outer ends of each finger are secured to the front part of the carriage-frame $i$, as by means of screws. The fingers of the platen-carriage may be bent downward and then outward, as seen at 13 in Fig. 10 of the drawings, and the fastening-screws projected through the outward-projecting parts into the carriage-frame. On the upper side of the front of the carriage-frame $i$ is secured a swinging frame $o''$, on which is pivoted the paper-feed roll $o'''$, that is held in yielding contact with the surface of the roller-platen by means of the spring $o^4$, secured at one end to the carriage-frame $i$ and thrusting with the other end $o^5$ against the upper part of the frame $o''$. This paper-feed roll has a series of grooves $o^6$ in its surface, and underneath these grooves spring-fingers $o^7$ extend to a line along the upper surface of the platen. Each of these fingers is secured to the swinging frame $o''$ at its lower end, so that when the frame is tilted forward, as by means of the arm $o^8$, rigidly connected to the side part of the frame, the spring-fingers as well as the paper-feed roll $o'''$ may be thrown back out of contact with the surface of the roller-platen or of any paper that may be located on the platen. As an additional means of holding the paper in position to be written upon, the swinging bail $o^9$ is pivoted to the side parts of the frame $o''$, and has a portion extending along the top of the roll, against which it is held by gravity or by means of a spring, as desired. The lower edge of a piece of paper to be written upon is thrust back of and under the roll that is turned as by means of the handle until the paper has reached the desired position on the roller-platen. If it is desired to change the position of the paper, as for the purpose of correcting the alignment or making an erasure, it can be readily moved by throwing the paper-feed roll out of contact with the platen-roller by means of the arm $o^8$, which leaves the paper free to be slipped about at will upon the roller.

On the back of the carriage-base A there is secured a bell $p$, its hammer $p'$ being pivoted to a rotary block $p''$, to which is pivoted the spring-retained dog $p'''$ in such manner that the dog may be swung directly outward from the carriage-base, as by the contact of a cam projection that slips under the beveled back edge of the dog, the front edge being square to encounter the squared front end of the cam projection that is borne on the trip $r$ on the carriage-frame $i$. The extent of leftward movement of the platen-roller carriage I is governed by an adjustable stop $q$, that is secured to the back of the base by means of screws passing through slots in the base of the stop, while the upturned end is arranged in the path of movement of the cam projection $r'$, that is borne on the under side of the adjustable trip $r$. This adjustable trip device $r$ is borne on a cogged rod $s$, secured to the back of the platen-carriage, the teeth of this rod being arranged with special reference to the number and position of the teeth on the back of the bar. The stop $r$ is borne on a frame $r''$, that is secured to the bar so as to have sliding movement only thereon, the movement of the stop being controlled by a locking-lever $r'''$, that is pivoted to the under side of the stop with a hooked end adapted to catch between the teeth on the bar and the other end projecting so as to serve as a handle or means for automatically removing the hold of this lever from the bar $s$ so as to allow the stop to be slid back and forth along the bar. This locking-lever is held by a spring $r^{10}$ so that its hooked end is normally in engagement with the cogged rod $s$. By means of this adjustable stop the exact extent of leftward movement of the carriage can be exactly regulated. A sheet of paper having been placed upon the platen-roller in the manner described, the platen-carriage is moved to the desired position, and by pushing downward upon any one of the pads the type-bar to which the lower end of the type-rod is pivotally connected is pushed forward and the type swung downward so as to strike upon the inking-ribbon in such manner as to print upon the paper the character that is borne on the type. When the end of a given line of writing is reached, which fact is denoted by the ringing of the bell a few letters previous to the contact of the stop and the trip device, already described, the handle of the detent-lever is grasped, giving a slight turn to the right and the carriage allowed to move to the left under the impulse of the spring-barrel or equivalent carriage-moving mechanism. When the end of the leftward movement of the carriage is reached, the detent-lever is turned toward the right and the rack-bar is thus thrown out of engagement with the escapement, leaving the carriage free to be moved to the right until the desired position for beginning another line is reached, when by a slight reversed turn of the detent-lever toward the left the platen-roller is turned a distance equal to a line-space. If desired, of course the leftward turn of the detent-lever may be made before the rightward, but these two movements of the detent-lever are necessary in order to move the paper forward a line-space and also to move the platen-carriage to the desired position for beginning to write another line.

I claim as my invention—

1. In a type-writing machine, in combination with a platen-supporting base provided with rearward-extending and upwardly-inclined arms, a key-base hinged to the free ends of the said arms to incline forwardly and having an open central portion, and type-bars and type-levers circularly disposed about the open center of the key-base, substantially as described.

2. In a type-writing machine, in combination with a platen-supporting base with grooved guideways, the oblong platen-carriage frame, the vertical rolls and the horizontal rolls pivotally supported on the platen-carriage frame and forming the support for one side thereof, and the roller pivoted to the front of the frame and forming the front support thereof, the paper supporting and feed mechanism borne on the carriage, and the roller-platen removably supported in the carriage-frame, all substantially as described.

3. In a type-writing machine, in combination with the carriage-supporting base, the reciprocating platen-carriage borne on said base, the carriage feed mechanism, the roller-platen M, mounted in said frame, the swinging roller feed-frame $m$, bearing the spring-pawl $m^8$, the roller-platen mounted in the platen-carriage $i$ and bearing a ratchet-wheel $m^7$, with the teeth of which the spring-pawl $m^8$ are in operative engagement, the swinging rack-bar $k'$, pivotally supported on the carriage, the shifting-lever K, mounted in the housing fast to the carriage-platen frame, the bent lever $k'''$, with one arm in engagement with the shifting-lever and the other in operative engagement with the roller feed-frame $m$, and the rack-bar $k$, all substantially as described.

4. In a type-writing machine, in combination with the platen-carriage-supporting base, the reciprocating platen-carriage borne on said base, the roller-platen mounted in the platen-carriage frame and bearing a ratchet-wheel, the roller feed-frame pivoted to the carriage-frame and bearing a spring-pawl in engagement with the ratchet-wheel of the roller-platen, the swinging rack-bar $k'$, supported on the carriage-frame and having ratchet-teeth in engagement with the escapement mechanism, the escapement mechanism, the shifting-lever housing secured to the rack-bar $j$, the rocking shifting-lever borne in said housing and in operative engagement with the bent lever, the bent lever pivoted to the housing and in operative engagement with the rack-bar $k'$, and the roller feed-frame, all substantially as described.

5. In a type-writing machine, in combination with the platen-carriage I, the roller-platen M, mounted in said carriage and bearing a ratchet-wheel $m^7$, the platen-carriage base A, the roller feed-frame $m$, pivoted to the platen-carriage and bearing the spring-pawl $m^8$, with its outer end in engagement with the teeth of the ratchet-wheel, the stop $m^{10}$, borne on the feed-frame $m$, the stop $n$, pivoted to the carriage-frame, having a series of shoulders adapted to be thrown into the path of movement of the stop on the roller feed-frame, all substantially as described.

6. In a type-writing machine, in combination with a platen-carriage I, the platen-roller borne in said carriage, the ratchet-wheel $m^7$, fast to the roller-platen, the roller feed device bearing the spring-pawl $m^8$, with the projecting pin $m^{10}$, and the cam-lever $n''$, pivoted to the frame and bearing a cam adapted to be thrown into engagement with the spring-pawl, whereby the latter is temporarily held out of engagement with the ratchet-wheel of the roller-platen, all substantially as described.

7. In a type-writing machine, in combination with the platen-carriage base A, the platen-carriage I, mounted on said base, the roller-platen mounted in the carriage-frame, and the roller feed mechanism, substantially as described, the swinging rack-bar $k'$ of the detent mechanism, the escapement in operative connection with the said rack-bar, the rocking detent-lever borne in the housing fast to the rack-bar $j$ and in operative connection with the swinging rack-bar $k$ and the roller feed mechanism, all substantially as described.

8. In a type-writing machine, in combination with the platen-carriage base, the reciprocating platen-carriage I, borne on said base, the arms $a'$ on said base supporting a swinging key-base, the escapement mechanism mounted in the base A and having the projecting arm with the upper end forked and in engagement with a projection on a part of the type-operating mechanism, all substantially as described.

9. In a type-writing machine, in combination with the base A, the reciprocating platen-carriage I, borne on said base, the roller-platen mounted in the platen-carriage, the within-described roller-platen feed mechanism, the paper-supports borne on said carriage, the paper-feed roll $o^3$, borne in the frame $o''$, and held in yielding contact with the roller-platen, the spring clamping-fingers $o^7$, borne on the frame $o''$, and the arm $o^8$, whereby the paper-feed roll may be lifted out of contact with the roller-platen, all substantially as described.

10. In a type-writing machine, in combination with the platen-carriage base, the reciprocating carriage mounted on said base, the cogged rod $s$ on the platen-carriage, the adjustable trip $r$, arranged on the cogged rod and formed with a projection $r'$, the locking-lever $r^3$, pivotally attached to the adjustable trip and formed with a hooked end to engage the teeth of the cogged rod, a spring to hold the locking-lever in engagement, and a stop $q$ on the base of the machine, substantially as and for the purpose specified.

11. In a type-writing machine, the circular key-base, the type-bars formed at their pivotal base with rearward-extending heel portions, the substantially vertically reciprocating collar arranged on the heel portions of the type-bars, the carriage escapement-lever, and means, substantially as specified, for connecting the said collar and the carriage escapement-lever, all combined as set forth.

12. In a type-writing machine, the circular key-base having an open center, the type-bars circularly arranged in the key-base and formed with rearward-projecting heel portions at their pivotal bases, and the substantially vertically reciprocating collar arranged on the heel portions of the type-bars, substantially as described.

JEROME B. SECOR.

Witnesses:
CHAS. L. BURDETT,
A. B. JENKINS.